United States Patent [19]

Kohzai et al.

[11] 4,403,181

[45] Sep. 6, 1983

[54] CONTROL SYSTEM FOR STOPPING SPINDLE AT PREDETERMINED ROTATIONAL POSITION

[75] Inventors: Yoshinori Kohzai; Yoshiki Fujioka; Naoto Ota, all of Hino, Japan

[73] Assignee: Fujitsu Fanuc Limited, Tokyo, Japan

[21] Appl. No.: 216,837

[22] Filed: Dec. 15, 1980

[30] Foreign Application Priority Data

Dec. 31, 1979 [JP] Japan .................... 54-172680

[51] Int. Cl.³ ............................................. G05B 1/06
[52] U.S. Cl. ................................. 318/664; 318/592
[58] Field of Search ............... 318/592, 664, 561, 571

[56] References Cited

U.S. PATENT DOCUMENTS

| | | | |
|---|---|---|---|
| 3,569,815 | 3/1971 | McNaughton | 318/664 |
| 3,663,880 | 5/1972 | Gabor | 318/603 |
| 3,824,891 | 7/1974 | Carroll | 318/39 X |
| 4,025,839 | 5/1977 | Muary | 318/592 |
| 4,117,386 | 9/1978 | Cohen et al. | 318/664 |
| 4,138,633 | 2/1979 | Narikiyo et al. | 318/664 X |
| 4,263,539 | 4/1981 | Barton | 318/664 |
| 4,345,192 | 6/1982 | Kohzai et al. | 318/592 |

FOREIGN PATENT DOCUMENTS 2402514 9/1977 France.

Primary Examiner—B. Dobeck
Attorney, Agent, or Firm—Staas & Halsey

[57] ABSTRACT

A system for stopping a spindle, which is provided in a machine tool, in such a manner that a specified point on the spindle is stopped at a predetermined rotational position. The system includes device for detecting the direction of spindle rotation. When the spindle arrives at a region where it is to be controlled in order to stop at the predetermined rotational position, a position deviation signal is applied as the input signal of a speed control loop for controlling the rotation of the spindle. This signal turns the specified point on the spindle to the predetermined rotational position, in the same direction in which the spindle is rotating, on the basis of the direction signal from the detecting means. That is, the specified point on the spindle is rotated to the predetermined rotational position in a direction which is the same as the direction of rotation during tool operation.

4 Claims, 23 Drawing Figures

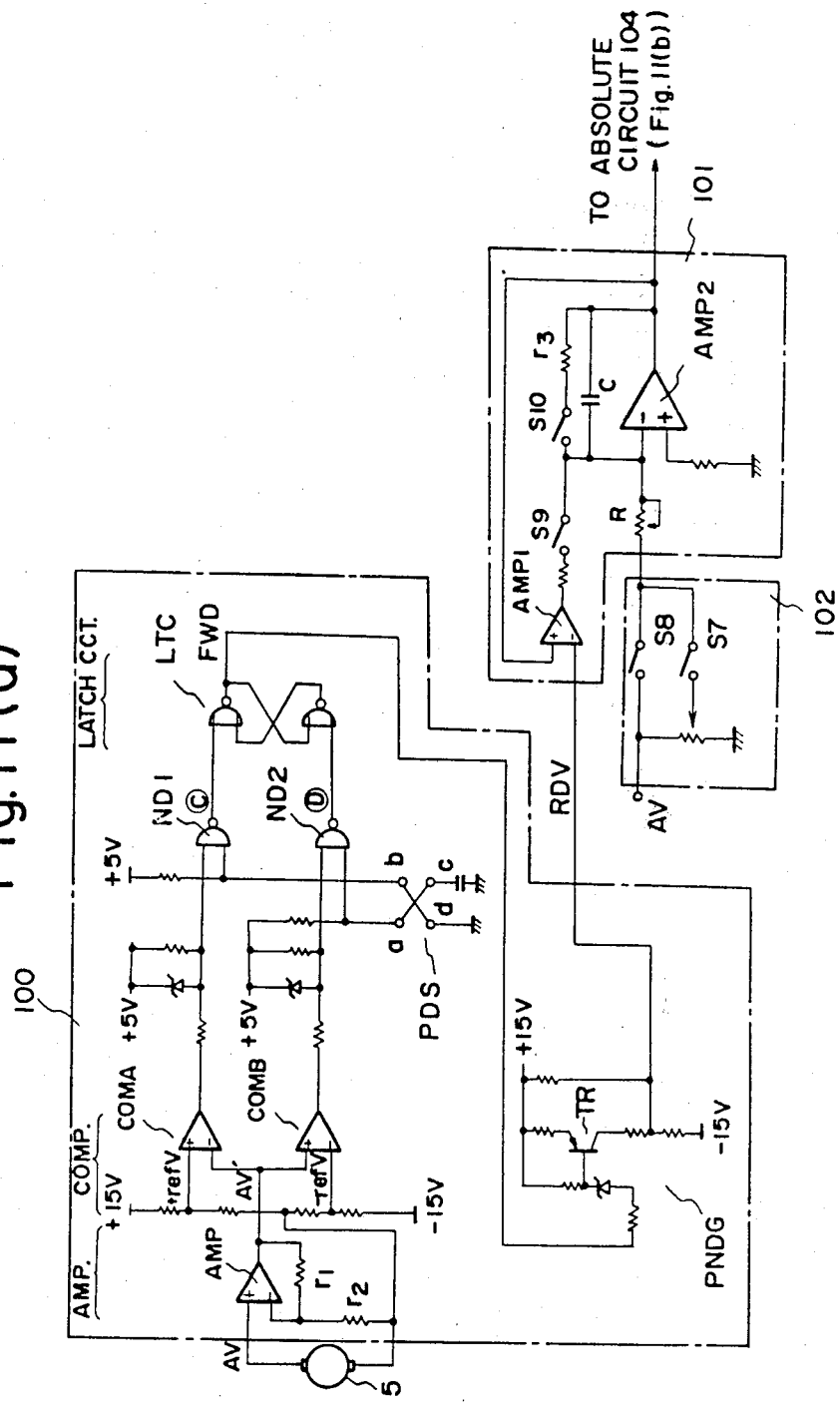

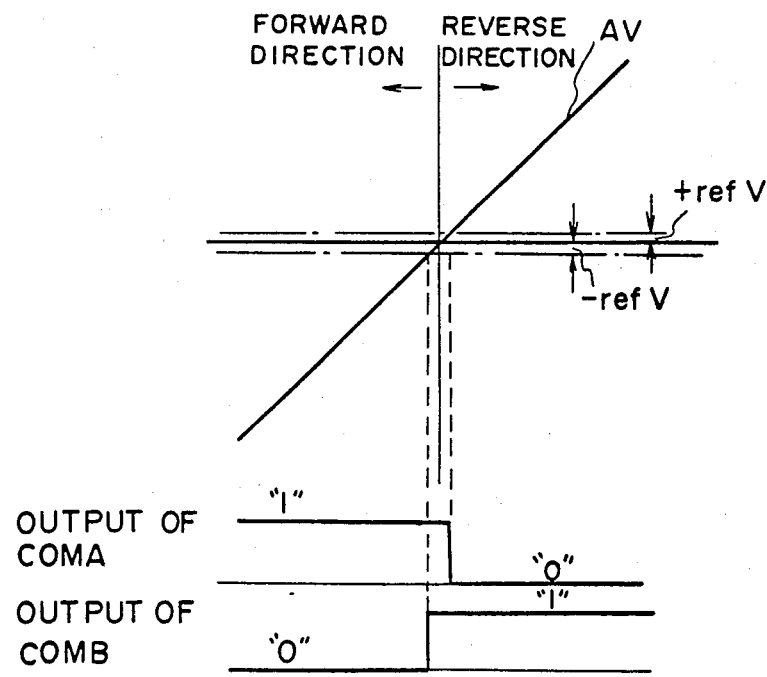

CONTROL SYSTEM FOR STOPPING SPINDLE AT PREDETERMINED ROTATIONAL POSITION

CROSS REFERENCES TO RELATED APPLICATIONS

This application is related to the following applications:

(1) U.S. Application Ser. No. 216,836 by Kahzai et al. entitled "Control System for Stopping Spindle At Predetermined Rotational Position"; and (2) U.S. Application Ser. No. 216,835 by Kohzai, et al. entitled "Control System for Stopping Spindle at Predetermined Rotational Position"; both of the above applications being assigned to the Assignee of the present application.

BACKGROUND OF THE INVENTION

This invention relates to a system for stopping a spindle at a predetermined rotational position, and more particularly to the system which is capable of stopping a spindle at the predetermined rotational position regardless of whether the spindle is rotating in the forward or reverse direction.

Machine tools with an automatic tool changing function are well known in the art. These are machine tools perform machining work automatically also allow tools to be changed, automatically. The tools carried by such machines are changed in the following manner. First, a magazine holding a number of tools is revolved to bring a vacant tool holding portion of the magazine into position directly above a spindle mechanism. The spindle mechanism, which is grasping an old tool to be exchanged for a new one, is then projected forwardly, after which the magazine positioned above the spindle mechanism is lowered to permit the old tool to be received and grasped by the vacant tool holding portion of the magazine. The spindle mechanism is then retracted so that the old tool separates from the spindle, thereby transferring the old tool to the magazine. Next, the magazine is revolved to bring the desired new tool into position in front of the spindle, and the spindle mechanism is moved forward to allow the spindle to receive and to grasp the new tool. Finally, the magazine is raised away from the spindle to complete the tool change operation.

It is necessary in the tool change mechanism of the foregoing type that a prescribed part of the spindle, such as a key member, be stopped accurately at the correct rotational position in order to permit the fitting portions of the spindle and tool to mate with each other smoothly. More specifically, a key is mounted on the spindle and a keyway is formed in the tool in order to mate with the key. The smooth mating of the spindle and tool requires that the spindle be positioned and stopped in order to provide the correct alignment of key and keyway. Meeting the above requirement necessitates a high spindle positioning accuracy of from ±0.1 to ±0.2 degrees with respect to the angle of rotation of the spindle.

Conventional automatic tool change mechanisms have a photoelectric detector or a limit switch mechanism which detects the rotational position of the spindle key in order to facilitate the smooth mating of the spindle and tool. The arrangement is such that the spindle is brought to a stop at the prescribed position by the application of a mechanical brake which is actuated in response to a signal from the key position detecting means.

The foregoing apparatus not only fails to provide the desired positioning accuracy but also has a stopping mechanism that experiences wear with long use, since the mechanism relies upon mechanical pin or brake means or the like. Such wear, particularly of a brake shoe or pin, makes it progressively more difficult to stop the spindle at the prescribed position, and the result is that the automatic changing of tools cannot proceed smoothly.

Accordingly, there is a need for a control system which is capable of stopping a spindle at a predetermined rotational position with a high degree of accuracy by purely electrical means, without relying upon a mechanical pin or mechanical brake mechanism to stop the spindle while performing an automatic tool change operation.

In addition, numerically controlled machine tools are being applied increasingly to the boring of such workpieces as automobile engine boxes. Such boring work requires the use of thicker boring bars or cutters in order to prevent chatter by increasing the boring bar rigidity. There are cases, however, where the use of thicker diameter boring bars cannot be avoided, even though the machine is boring through a hole whose dimensions are such that the thicker boring bars cannot be further inserted. This point will be elaborated in the following description of a boring machine tool.

FIG. 1 is an illustrative view of a boring machine tool in simplified form. Provided are a headstock 201, a boring bar 202, and a cutting tool 203. A workpiece 204, which is carried on a table 205, includes holes 204a, 204a' for receiving the boring bar 202, and a hollow portion 204b. In the boring machine tool of this type, the cutting tool 203 is inserted into the hollow portion 204b of the workpiece 204 through either the insertion hole 204a or 204a', after which the workpiece is moved relative to the cutting tool to permit the cutting tool to bore the workpiece in a prescribed manner. The holes 204a, 204a', since they are eventually to be covered, are comparatively small in diameter. It is therefore necessary to select a boring bar 202 having a small diameter, as shown in FIG. 2, in order to prevent the cutting tool 203 from contacting the periphery of the hole 204a when the boring bar is inserted into and withdrawn from the interior of the workpiece. The small diameter boring bar experiences chatter during machining thus, a high degree of boring accuracy cannot be achieved.

Proposed methods for solving the above problem are shown in FIGS. 3 and 4, wherein arrangements are adopted that permit utilization with a boring bar 202 of a larger diameter. In accordance with the method of FIG. 3, the center of the boring bar 202 is offset from the center of the hole 204a along the Y-axis when the boring bar is inserted and withdrawn, the cutting tool 203 being positioned so as to coincide with the Y-axis. It should be noted, however, that the choice of the X-axis here is illustrative only. In accordance with the method of FIG. 4, a cutting tool insertion notch 204c is formed in the workpiece 204 as part of with the insertion hole 204a, and the cutting tool 203 is positioned so as to coincide with the notch 204c when the boring bar is inserted and withdrawn. Both methods depicted in FIGS. 3 and 4 reduce chattering or vibration by allowing the use with a boring bar of a larger diameter. When the cutting tool is inserted into the workpiece and when its rotation is stopped after a machining operation, both of the above methods require that the spindle of the machine tool be stopped accurately at a predetermined rotational position which position is aligned with the positive Y-axis in the arrangement of FIG. 3 or with the position of the cutting tool insertion slot 204c in the arrangement of FIG. 4. In other words, in order to eliminate chatter and effect a rigid machining operation by employing a boring bar of a larger diameter, a control system is required by which the spindle holding the boring bar can be stopped at a predetermined rotational position.

To this end, the assignee of the present invention has already proposed a system for stopping a spindle at a predetermined rotational position through purely electrical means. The immediately above-mentioned system is disclosed in copending U.S. Application Ser. No. 190,659 by Kohzai, et al. entitled "Spindle Rotation Control System", and U.S. Application Ser. No. 215,631 by Fujioka entitled "Control System for Stopping Spindle At Predetermined Rotational System". With this proposed system, however, it is required that the spindle be rotating in a certain direction, such as the forward direction, in order to stop the spindle at the predetermined rotational position. It is not possible to stop the spindle at the predetermined position when it is rotating in the other direction, namely the reverse direction. Accordingly, when the spindle is rotating in the reverse direction, it is necessary to bring the spindle to a halt and then rotate it in the forward direction in order to stop it at the predetermined rotational position. This procedure is combersome and may give the operator a sense of frustration. More importantly, in a boring machine where boring is taking place by rotating the spindle in the reverse direction, a problem is encountered. The problem arises because the cutting tool must be rotated in a direction opposite to that of the machining direction, namely in the forward direction, at the conclusion of the boring work in order to properly orient the cutting tool so that it may be withdrawn from the hole in the workpiece. The problem caused is that the cutting edge of the tool may contact the workpiece in a direction opposite to that of the cutting direction and produce a flaw, such as a kerf, in the side wall of the bore. Since the flaw lowers the value of the article it is necessary to remove the flaw by a costly and time-consuming grinding process. Still another drawback is the considerable time required to finally stop the spindle at the predetermined rotational position. This is because the spindle, which is rotating in the reverse direction in the above example, must first be halted, rotated again in the opposite (forward) direction, and then brought to a stop at the predetermined position. Since this troublesome operation must be repeated for changing tools and for inserting and withdrawing the boring bar, considerably machining time is lost so that the overall machining efficiency declines.

SUMMARY OF THE INVENTION

It is an object of the present invention to provide a control system for stopping a spindle at a predetermined rotational position regardless of whether the spindle is rotating in the forward or reverse direction.

Another object of the present invention is to provide a novel control system for stopping a spindle at a predetermined rotational position in a short period of time regardless of whether the spindle is rotating in the forward or reverse direction.

A further object of the present invention is to provide a novel control system for stopping a spindle at a predetermined rotational position regardless of whether the spindle is rotating in the forward or reverse direction, and which will not flaw a workpiece in a boring operation when that the spindle is stopped at predetermined position.

Other features and advantages of the invention will be apparent from the following description taken in conjunction with the accompanying drawings.

BRIEF DESCRIPTION OF THE DRAWINGS

FIGS. 11(a) and 11(b) are detailed circuit diagrams of principal portions of a rotational position deviation signal generating circuit;

FIGS. 13(a) and 13(b) are illustrative views which are useful in describing the operation of a DC voltage generating circuit.

DESCRIPTION OF THE PREFERRED EMBODIMENT

Figure 1:
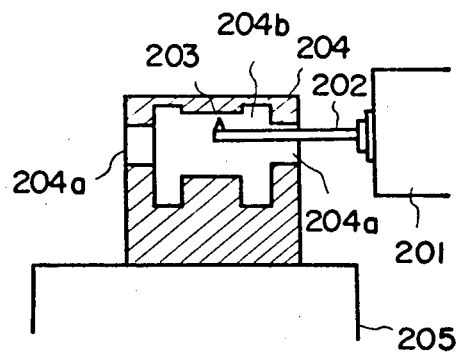
FIG. 1 is an illustrative view showing a boring machine tool in simplified form.
Figure 2:
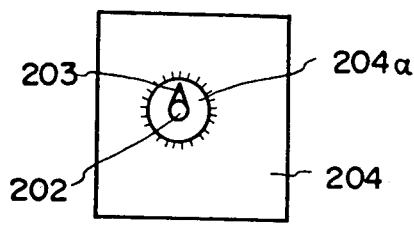
FIG. 2 is an illustrative view showing the positional relationships between a cutting tool, a boring bar and a hole, located in the workpiece, for receiving the cutting tool and boring bar.
Figure 3:
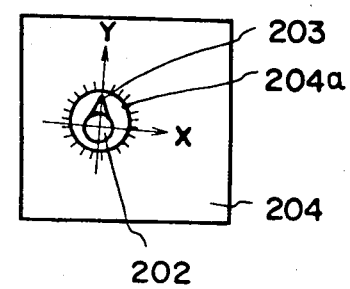
FIGS. 3 and 4 are illustrative views showing methods of inserting a boring bar into a hole located in a workpiece.
Figure 4:
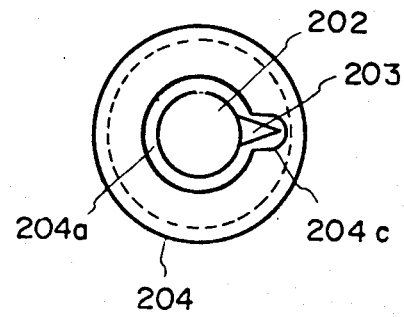
Figure 5:
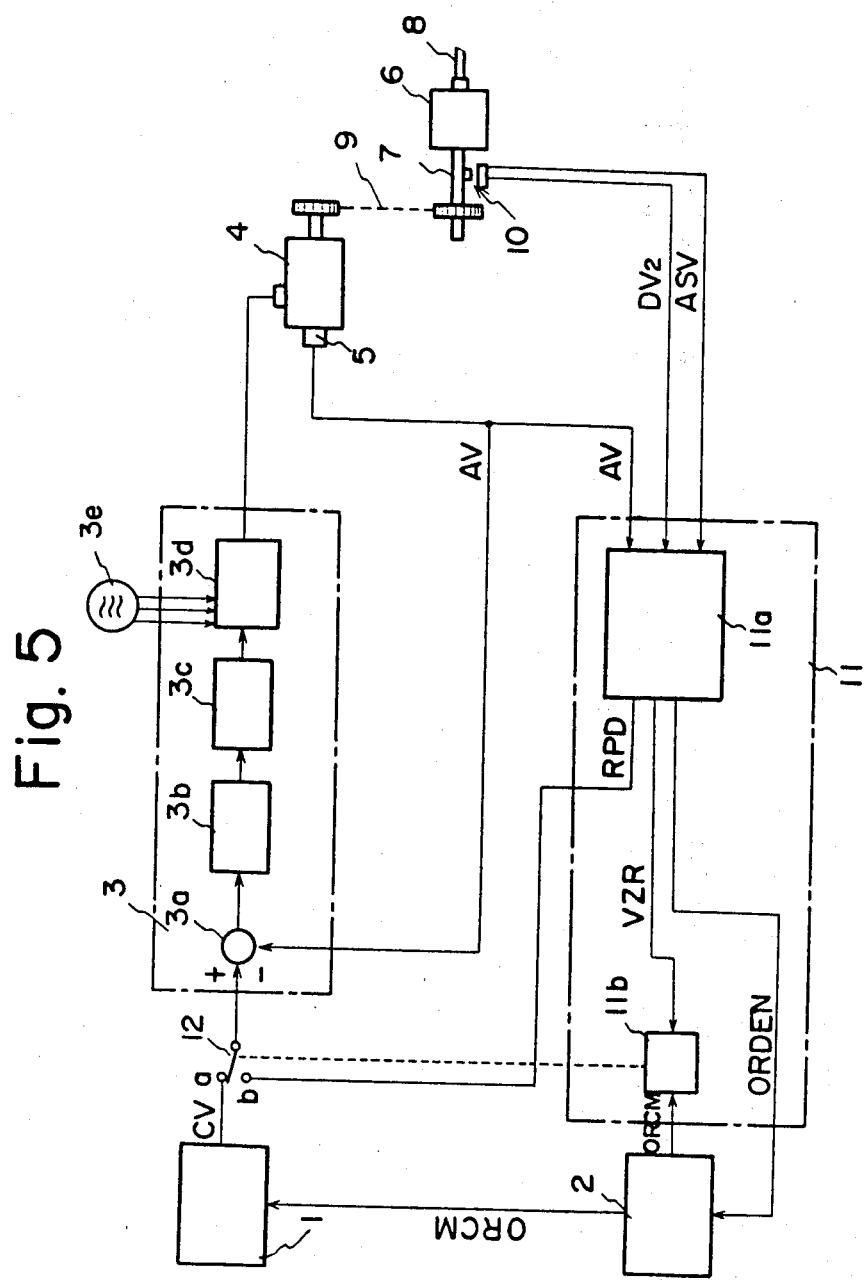
FIG. 5 is a block diagram of a control apparatus for stopping a spindle at a predetermined rotational position in accordance with the present invention.
Figure 6A:
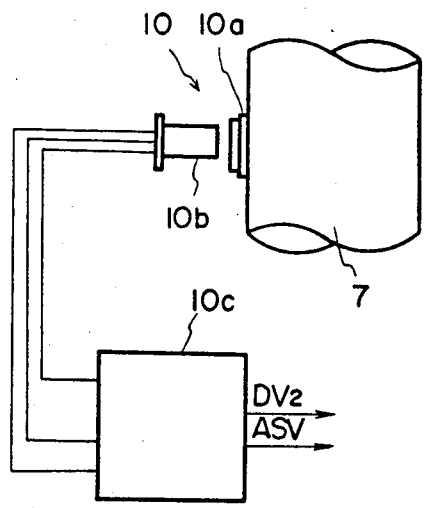
FIGS. 6(a) and 6(b) are illustrative views showing the arrangement of a position sensor spindle.
Figure 6B:
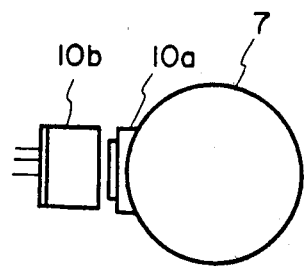
Figure 6C:
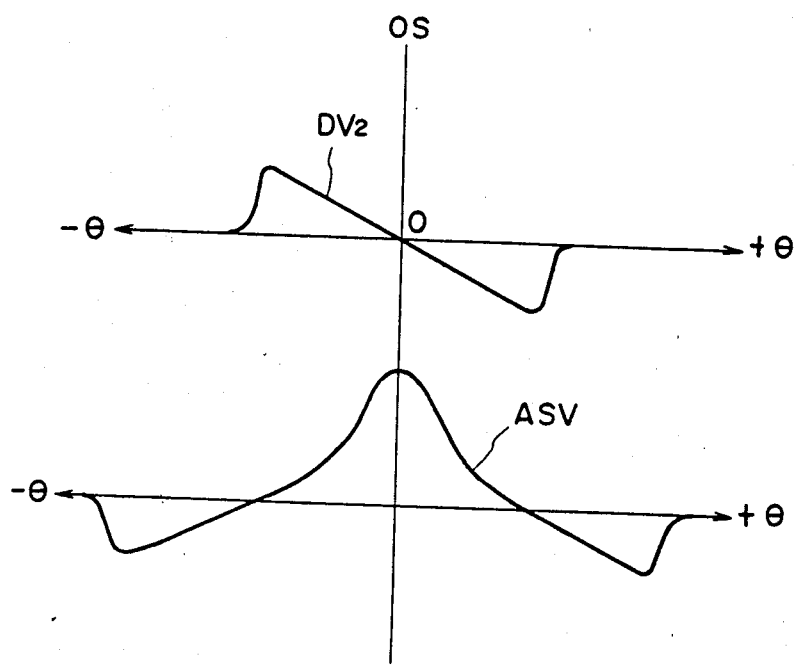
FIG. 6(c) is a waveform diagram of output signals associated therewith.

Referring now to FIG. 5, there are included a speed command circuit 1 for generating a speed command CV, and an orientation command circuit 2 for generating an orientation command ORCM. A speed control circuit 3 includes an adder 3a, a phase compensating circuit 3b connected to the output of the adder, a voltage-to-phase converter 3c connected to the output of the phase compensating circuit, and a thyristor converter 3d connected to the output of the converter 3c. The adder 3a is constructed so that it generated both (1) a difference voltage, representative of a speed deviation, which is the difference between the voltage of the speed command CV and the voltage of an actual speed signal, during a speed control operation, and (2) generates a difference voltage between a rotational position deviation RPD and the actual speed AV. The phase compensating circuit 3b subjects the output voltage of the adder 3a to a phase compensation by advancing or retarding the phase of the output of the adder 3a. The voltage-to-phase converter 3c controls the firing angle of each thyristor in the thyristor converter 3d in dependence upon the output voltage of the phase compensating circuit 3b. The thyristor converter 3d operates, in dependence upon the controlled firing angles of its thyristors, to convert the three-phase voltage from a three-phase power supply 3e into a direct current. The direct current is used to vary the value of the voltage applied to a DC motor 4 which will be described later, thereby to regulating the speed at which the motor rotates. The DC motor 4 and serves as a spindle drive motor. As the DC motor 4 rotates, a tachometer generator 5 generates a voltage in dependence upon the motor speed. The rotational motion of the DC motor 4 is transmitted through a gear mechanism 9 to a spindle 7. The spindle 7 is coupled to a spindle mechanism 6 which holds a tool 8. It should be noted that the gear mechanism 9 may be replaced by a belt mechanism which includes a timing belt or the like. A rotational position sensor 10 is constructed so that it will detect the rotational position of the spindle 7 and comprises a magnetic body 10a which is attached to the spindle 7, a sensing portion 10b which is attached to a stationary portion of the machine such as the spindle bearing portion, for sensing the magnetic body 10a, and an electrical circuit 10c, as shown in FIGS. 6A and 6B. The position sensor 10 generates a fine position deviation signal $DV_2$ and an approach signal ASV, shown in FIG. 6C, which vary in accordance with the rotational deviation of the spindle 7 with respect to a predetermined rotational position OS at which a specified point on the spindle is to be stopped.

An orientation control circuit 11 includes a rotational position deviation signal generating circuit 11a which receives the fine position deviation signal $DV_2$, the approach signal ASV, and the signal AV, indicative of the actual speed of the spindle, generates by the tachometer 5. The orientation control circuit 11 generates the rotational position deviation signal RPD which serves as a spindle speed command signal when an operation which is for stopping the spindle at the predetermined rotational position is being carried out, an orientation completion signal ORDEN, and a zero speed signal VZR. The orientation control circuit 11 also includes a loop changeover circuit 11b for actuating a loop changeover switch 12 in dependence upon both of the orientation command signal ORCM outputted by the orientation command circuit 2 and the zero speed signal VZR outputted by the position deviation signal generating circuit 11a.

Figure 7A:
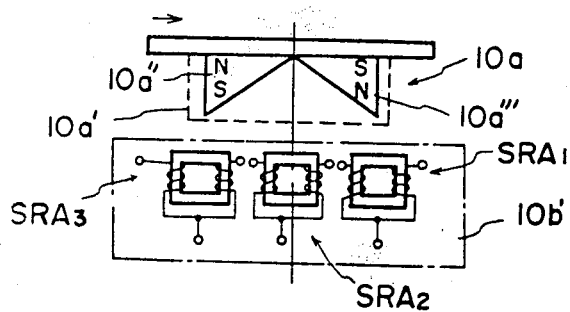
FIGS. 7(a) and 7(b) are illustrative views showing the internal structure of the position sensor of FIG. 6.
Figure 7B:
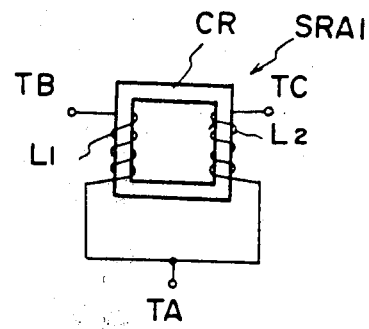

Reference will now be made to FIGS. 6(a) and 6(b) for a complete understanding of the structure and operation of the position sensor 10, FIG. 6A showing a front view and FIG. 6B a plan view of an example in which the magnetic body 10a is mounted on the spindle 7. It should be noted that the sizes of the magnetic body 10a and sensing portion 10b are exaggerated in comparison with the size of the spindle 7. The magnetic body 10a is so mounted on the spindle 7 so that the center of the magnetic body 10a will coincide with the center of the sensing portion 10b when a specified point on the spindle is located at the predetermined rotational position at which the spindle is desired to be stopped. As the spindle 7 rotates the electrical circuit 10c generates the fine position deviation signal $DV_2$ and the approach signal ASV having the waveforms shown in FIG. 6c. The magnetic body 10a, as shown in FIG. 7a, has magnets 10a'', 10a''', having of a triangular cross-section, mounted in a case 10a' in such a manner than the intensity of the magnetic field changes from S to N in the direction of spindle rotation, i.e., in the direction of the arrow. The sensing portion 10b is mounted on a mechanically stationary portion of the machine so as to confront the magnetic body 10a, and includes three saturable reactors $SRA_1$, $SRA_2$ and $SRA_3$ included in a case 10b' and aligned in the direction of spindle rotation, as shown in FIG. 7a. Each of the saturable reactors comprises coils $L_1$ and $L_2$ wound on a core CR, as shown in FIG. 7b. The coils $L_1$ and $L_2$ on each core have the same number of turns and are wound in opposite directions. The coils on each core share a common terminal TA to which a high-frequency signal is applied, and signals, which are in dependant upon the rotational position of the magnetic body 10a, are generated at the terminals TB, TC of the respective coils.

Figure 8:
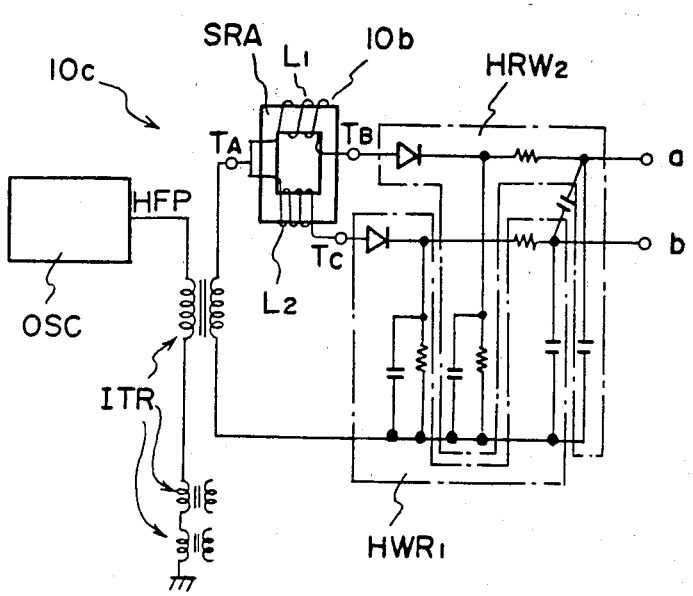
FIG. 8 is a circuit diagram of a portion of the position sensor of FIG. 6.

Included in the electrical circuit, 10c is a circuit shown in FIG. 8, associated with a corresponding one of the saturable reactors SRA, for processing the signal generated by the respective reactor. Included in the electrical circuit 10c are a pulse oscillator OSC for generating a 100 kHz high-frequency signal, an isolating transformer ITR, and half-wave rectifiers $HWR_1$ and $HWR_2$. The saturable reactor SRA is excited by the high-frequency pulse signal HFP through the intermediary of the isolating transformer ITR. As a result, an analog output voltage is obtained across the terminals a and b of the circuit, which analog output voltage is proportional to the external magnetic field $H_{ext}$. The external magnetic field strength varies in dependence upon the rotational position of the magnetic body 10a.

Figure 9A:
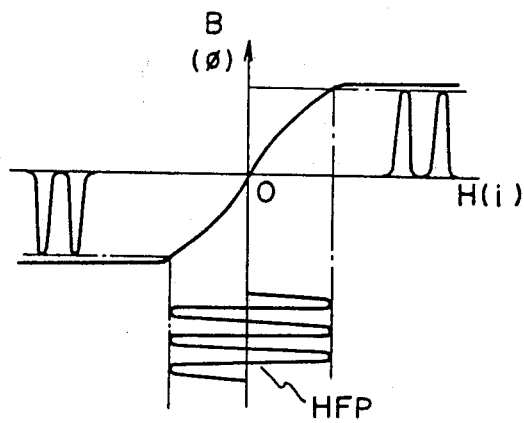
FIGS. 9(a), 9(c) and 9(d) are graphs and 9(b) is an illustrative view which are useful in describing the operation of the position sensor.
Figure 9B:
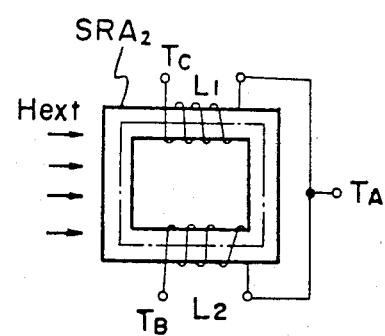
Figure 9C:
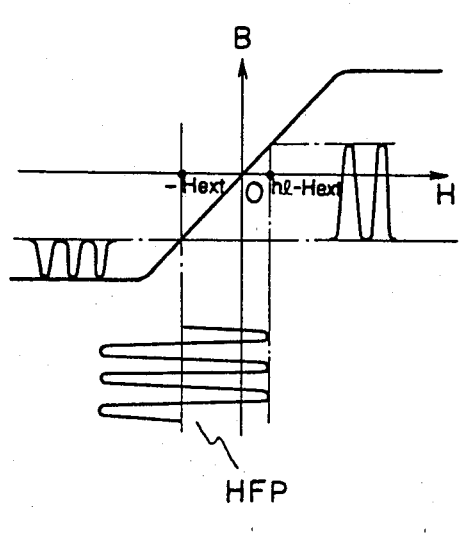
Figure 9D:
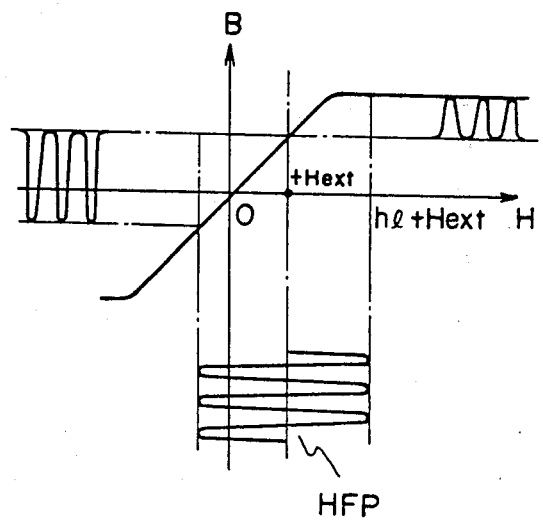

The action of the analog output voltage which is obtained across the terminals a and b and which depends upon the rotational deviation of the spindle 7 will now be described in connection with the reactor $SRA_2$ shown in FIG. 7(a). When the magnetic body 10a is remote from the saturable reactor $SRA_2$ so that the external magnetic field acting upon the reactor has a value approaching zero, the high-frequency pulse signal HFP acts about the vertical zero line of the reactor flux density vs. magnetizing force, as shown in FIG. 9(a). In other words, the number of lines of flux cutting the coils $L_1$, $L_2$ are equal, so that the output voltages from the terminals TB and TC are equal in amplitude but displaced in phase by 180 degrees. It should be noted that the core comprising the saturable reactor SRA2 has a hysteresis characteristic which is so small as to be negligible. Since the voltages from the terminals TB and TC are rectified by the respective half-wave rectifiers $HWR_1$ and $HWR_2$ and the potentials at the terminals a, b are equal, so that the voltage across a and b is zero. Now, as the spindle 7 rotates and the magnetic body 10a approaches the centrally located saturable reactor $SRA_2$, the external magnetic field $H_{ext}$ being generated by the magnetic body begins to act upon the saturable reactor $SRA_2$. If we let $h_f$ denote the field generated by the high-frequency pulse signal HFP, a flux of $h_f - H_{ext}$ will cut the coil $L_1$, as shown in FIG. 9(b), and a flux of $h_f + H_{ext}$ will cut the coil $L_2$. If this is expressed using a B-H curve, the high-frequency pulse signal HFP will act abpout the line $-H_{ext}$ with respect to the coil $L_1$, as shown in FIG. 9(c), and about the line $+H_{ext}$ with respect to the coil $L_2$, as depicted in FIG. 9(d). Therefore, the negatively directed flux which cuts the coil $L_1$ causes saturation of the core so that there is a smaller amount of amplitude variation, whereas the negatively directed flux which crosses the coil $L_2$ does not cause saturation so that there is a greater amount of amplitude variation. Because the induced voltage e takes on the value $-Nd\phi/dt$ (where N is the number of turns), the potential at the terminal b will become greater than the potential at terminal a, giving rise to a potential difference between the terminals. This potential difference will vary in the manner of the fine position deviation signal $DV_2$ shown in FIG. 7(c) and, as the magnetic body 10a continues to rotate, will become zero when the center of the magnetic body 10a coincides with the center line of the saturable reactor $SRA_2$. The result is an analog voltage signal having maximum and minimum values. Similarly, the saturable reactors $SRA_1$ and $SRA_3$ on the left and right sides of the sensing portion 10b, respectively, and the two half-wave rectifiers associated with each reactor, cooperate to generate a potential difference across the terminals a and b of each corresponding circuit. This potential difference also defines an analog voltage signal, similar to that of the fine position deviation signal $DV_2$, having maximum and minimum values. Thus, the analog voltage signals associated with the reactors $SRA_1$ and $SRA_3$ also depend upon the rotation of the magnetic body 10a on the spindle 7.

Figure 7C:
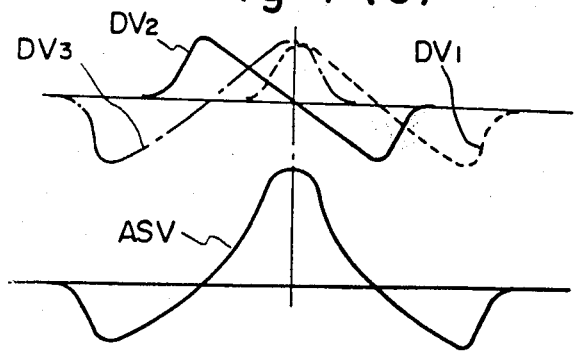
FIG. 7(c) is a waveform diagram of output signals associated therewith.

The electrical circuit 10c of the position sensor 10 further includes a conversion circuit for generating signal $DV_3$, shown in FIG. 7(c), by subjecting to a 180-degree phase conversion the analog voltage signal which is generated by the saturable reactor $SRA_3$ and which varies in dependence upon the rotational movement of the magnetic body 10a. The electrical circuit 10c also includes a circuit which generates the approach signal ASV, also shown in FIG. 7(c), by adding together the fine position deviator signal $DV_3$ and the analog voltage signal, denoted by $DV_1$, which is generated by the saturable reactor $SRA_1$ and which varies in dependence upon the rotational movement of the magnetic body 10a. The approach signal ASV indicates that a specified point on the spindle 7 has reached a point in the environs of the predetermined rotational position.

Figure 10:
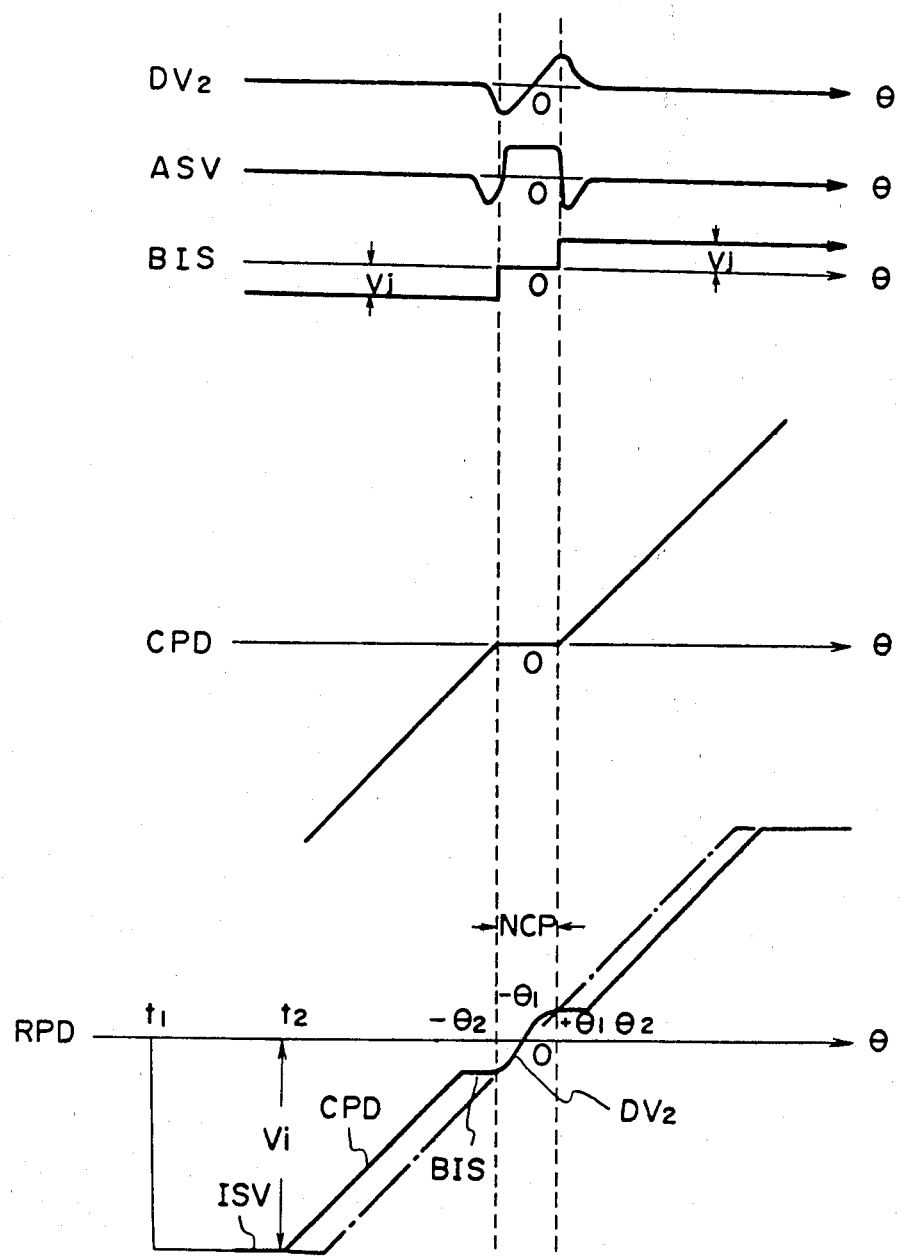
FIGS. 10(a) and 10(b) are waveform diagrams associated with the control system of the present invention.

The operation of the rotational position deviation signal generating circuit 11a will now be described with reference to FIGS. 5 and 10(a).

The rotational position deviation signal generating circuit 11a, shown in FIG. 5, receives the fine position deviation signal $DV_2$, the approach signal ASV output by the position sensor 10 and the actual speed signal AV from the tachometer 5. The actual speed signal AV is integrated within the circuit 11a, and the output signal resulting from the integration operation is subtracted from a yet to be described initially set voltage ISV ($-V_i$ when the spindle is rotating in the forward direction and $+V_i$ when the spindle is rotating in the reverse direction). Thus, the signal AV is converted into a coarse position deviation signal CPD. The voltage value $V_i$ of the voltage ISV has been set so that it is equal to a rotational position deviation voltage which corresponds to one revolution (360° C.) of the spindle. Further, the rotational position deviation signal generating circuit 11a includes a bias signal BIS, which is generated and retained within the circuit, having an amplitude which is equivalent to the peak value of the fine position deviation signal $DV_2$.

When the speed command CV falls to zero in accordance with an orientation command signal ORCM output by the orientation command circuit 2, the rotational speed AV of the spindle diminishes, and eventually (at time $t_1$) falls to zero (zero speed signal VZR goes to logical "1"). When this occurs, the rotational position deviation signal generating circuit 11a generates the initially set voltage ISV from the time that the zero speed signal VZR goes to logical "1" until the time $t_2$ at which the spindle initially reaches the predetermined rotational position. (Before proceeding further, it will be assumed that the spindle is rotating in the forward direction at the time that it is to be stopped at the predetermined rotational position). Thereafter, as the spindle begins and then continues to rotate, and the magnetic body 10a (the specified point on the spindle) approaches the predetermined rotational position for the second time, the coarse position deviation signal CPD, whose polarity will be negative, is generated until the magnetic body 10a draws near to the area NCP (defined between $-\theta_1$ and $+\theta_1$) in the environs of the predetermined rotational position, that is, until it arrives at the position $-\theta_2$. Furthermore, the bias signal BIS is $-V_j$ until the above mentioned area NCP is reached. The fine position deviation signal $DV_2$ is generated after the magnetic body 10a has reached and entered the area NCP in the environs of the predetermined rotational position. The result of these operations is the generation of the rotational position deviation signal RPD, whose polarity is negative, which is shown in FIG. 10(a). It should be noted that the bias signal waveform BIS may be excluded from the signal RPD by setting $\theta_2$ equal to $\theta_1$.

If the spindle is to be stopped at the predetermined rotational position while rotating in the reverse direction, $+V_i$ is generated as the initially set voltage signal ISV, a coarse position deviation signal of a positive polarity is provided as the signal CPD, and $+V_j$ is generated as the bias signal BIS. The result is generated rotational position deviation signal RPD having a positive polarity.

The operation of the control circuit of FIG. 5, used for stopping the spindle at a predetermined rotational position, will now be described with reference to FIGS. 5 and 10(b) for a case in which the spindle 7 is rotating in the forward direction. It should be noted that the rotational position deviation signal RPD in FIG. 10(b) is shown as its absolute value.

During rotation of the spindle the changeover switch 12 is connected to the a side in FIG. 5, thereby creating a speed control loop. More specifically, the adder 3a receives the speed command signal CV and the actual speed signal AV from the tachometer 5, and responds by generating a rotational speed deviation voltage. The voltage-to-phase converter 3c controls the firing angle of the thyristors in the thyristor converter 3d in dependence upon the speed deviation voltage, so that the thyristor converter 3d regulates the voltage applied to the DC motor 4. As a result, the actual speed of the motor 4 is regulated to bring it into coincidence with the speed command. Therefore the speed control loop regulates the speed of the motor in order to rotate the spindle at approximately the command speed.

Figure 10B:
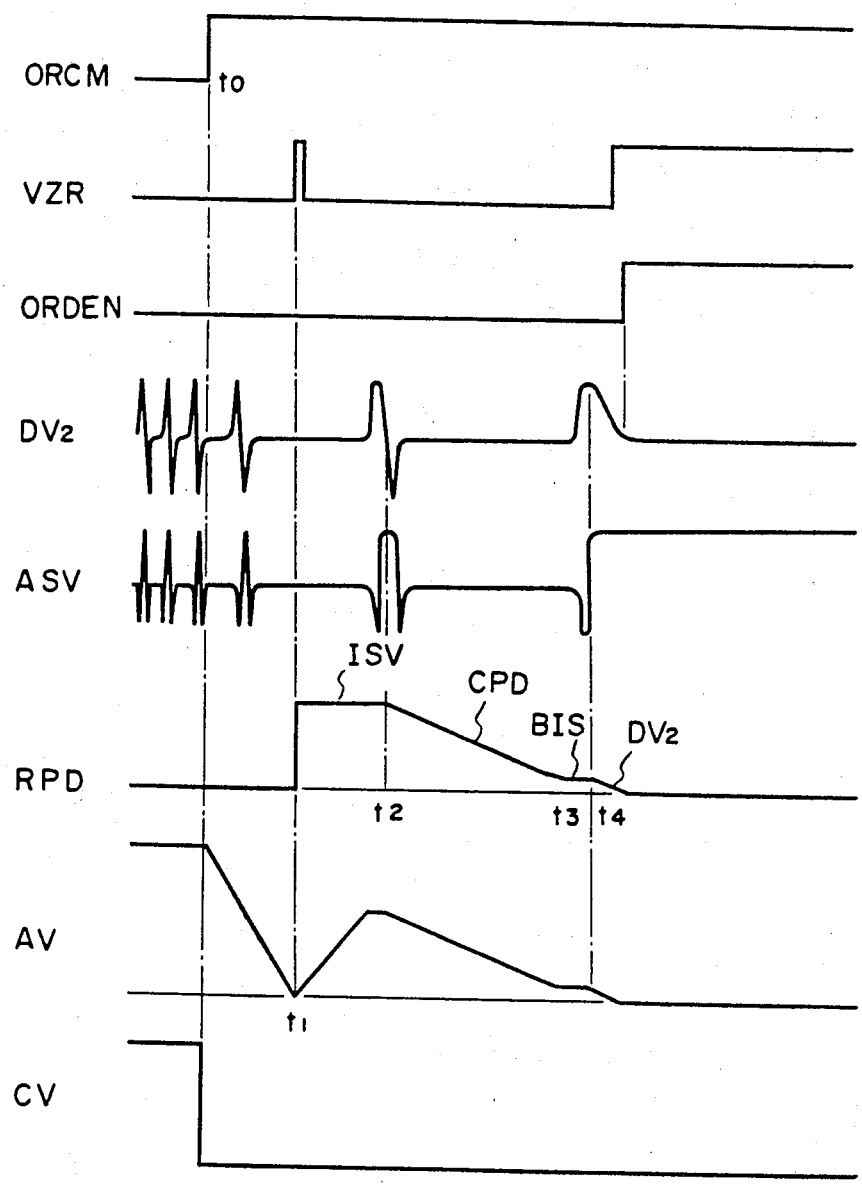

When the machining work is completed under these conditions, a control device, such as a numerical control device, instructs the orientation command circuit 2 to apply the orientation command signal ORCM to the loop changeover circuit 11b at the time $t_0$, shown in FIG. 10(b) in order to place this circuit in the set state. At the same time, the orientation command signal ORCM is applied to the speed command circuit 1, so that the speed command CV drops to a voltage of zero. The actual speed of the spindle consequently decreases and reaches zero at time $t_1$. When this occurs, the zero speed signal VZR is generated within the position deviation signal generating circuit 11a, and causes the loop changeover circuit 11b to change the switch 12 from the side a to the side b, so that circuit operation now changes from speed control to position control. The position deviation signal generating circuit 11a first generates the initially set voltage IVS(=$V_i$) at the same time that the speed zero signal VZR is generated in response to this signal the spindle begins to rotate again so that the actual speed signal AV, indicative of the actual speed of the spindle, rises to assume the value $V_i$. As the magnetic body 10a continues to rotate and reaches the predetermined rotational position for the first time (time $t_2$), the rotational position deviation signal generating circuit 11a begins generating the coarse position deviation signal CPD. As the spindle continues to rotate and the magnetic body 10a approaches the point in the environs of the predetermined rotational position (time $t_3$), the position deviation signal generating circuit 11a generates the bias signal BIS. Then, when the magnetic body 10a arrives at the above mentioned area (time $t_4$), the fine position deviation signal $DV_2$ starts being generated. When the signal $DV_2$ has decreased to zero, namely when the central portion of the magnetic body (the specified point on the spindle) is directly confronting the central portion of the saturable reactor $SAR_2$, the spindle stops rotating. This completes positioning control of the spindle.

Figure 11B:
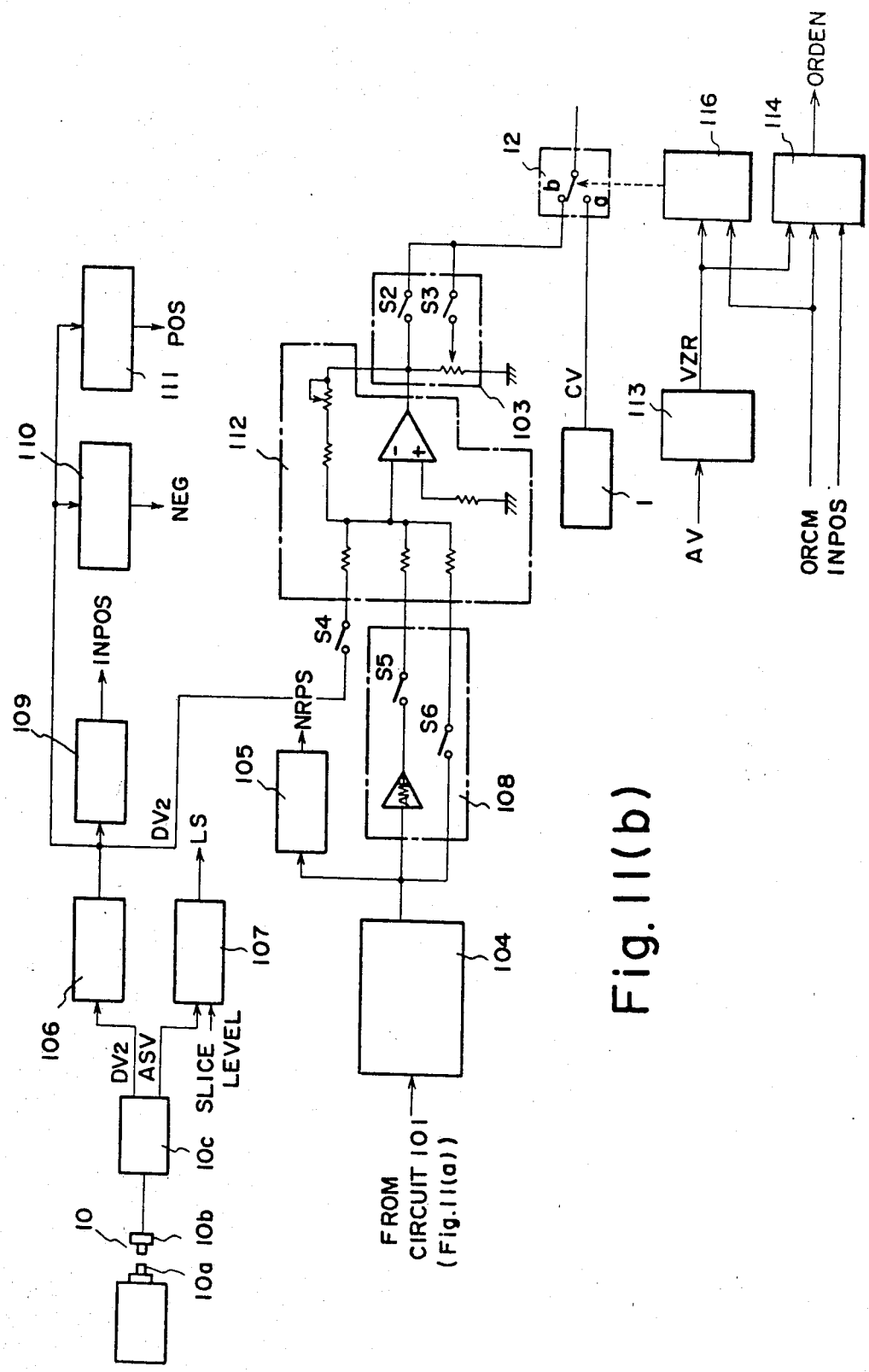
Figure 12:
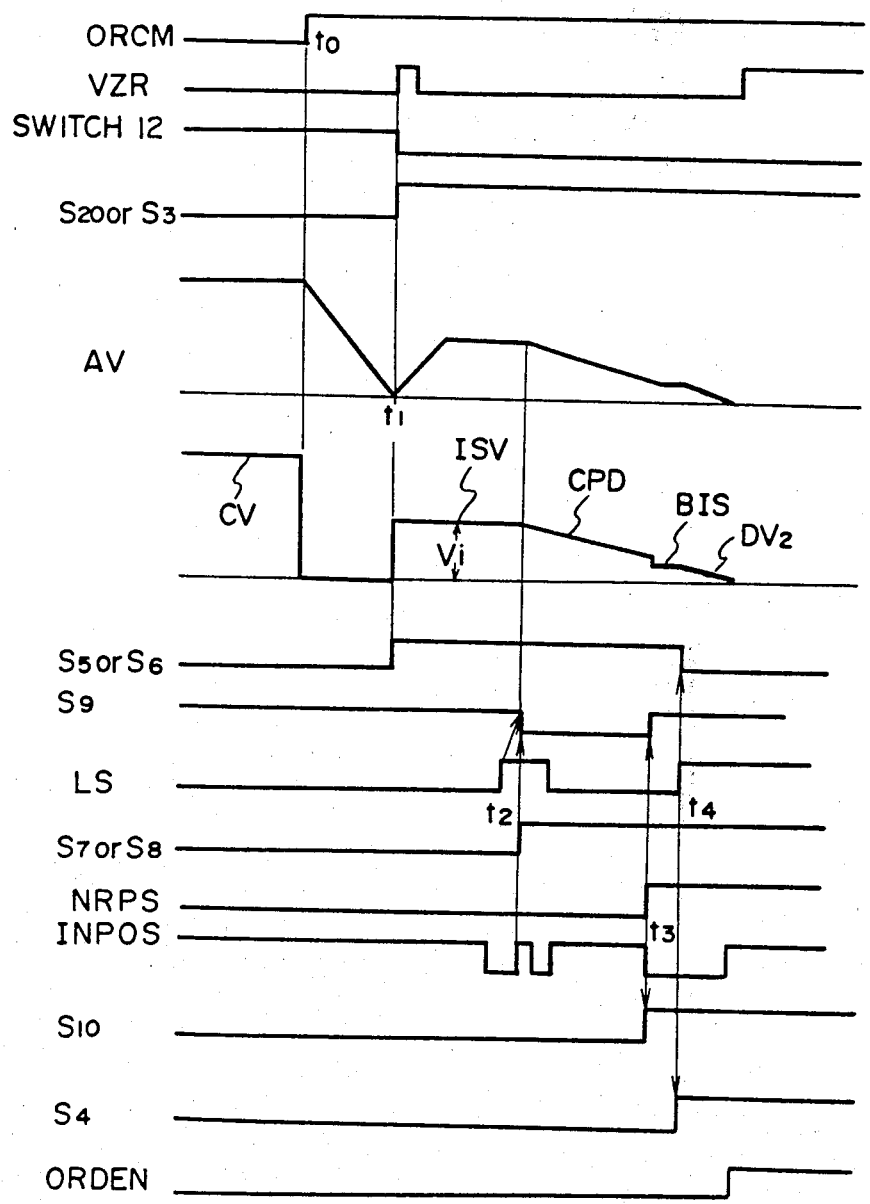
FIG. 12 is a waveform diagram of signals associated with the rotational position deviation signal generating circuit of FIG. 11.

Reference will now be made to FIGS. 11(a) and 11(b) for complete understanding of the principal portions of the rotational position deviation signal generating circuit 11a, and to FIG. 13 for a description of a DC voltage generating circuit which generates the voltages +$V_i$ and −$V_i$ as the signal ISV in dependence upon the direction of spindle rotation. Blocks in FIGS. 11(a) and 11(b) identical with those of FIG. 5 are denoted by like reference characters and are not described again in order to avoid prolixity.

The DC voltage generating circuit, denoted as numeral 100 in FIG. 11A, generates a DC voltage RDV whose polarity depends upon the direction of spindle rotation. An operational amplifier AMP amplifies the output AV of the tachometer 5, the output AV representing the actual speed of the spindle. The amplified signal, namely a voltage AV' indicative of actual spindle speed, is applied to comparators COMA and COMB. The comparator COMA compares the amplitude of the voltage AV' with a reference voltage +refv (+75 mV), and generates a signal at logical "0" when AV'> +refv, and at logical "1" when AV'≦+refv. The comparator COMB compares the amplitude of the voltage AV' with a reference voltage −refv (−75 mV), and generates a signal at logical "1" when AV'>−refv, and at logical "0" when AV'≦−refv. This is shown in FIG. 13A. The voltage level of logical "0" is higher than +4.5 volts, and the voltage level of logical "1" is lower than 0 volts. In accordance with the foregoing, the outputs of comparators COMA and COMB are "1" and "0", respectively, when the spindle is rotating in the forward direction, and "0" and "1", respectively, when the spindle is rotating in the reverse direction.

Setting means PDS such as a switch is included to present the direction from which the spindle will be stopped at the predetermined rotational position. A connection between the points a and c and between the points b and d will allow the spindle to be stopped at the predetermined position when the spindle is rotating in the forward direction, whereas a connection between the points b and c and between the points a and d will allow the spindle to be stopped at the predetermined position when rotating in the reverse direction. $ND_1$ and $ND_2$ are NAND gates which have their outputs connected to a latch circuit LTC. The latch circuit LTC generates a rotational direction signal FWD which is transmitted to an analog circuit PNDG. The analog circuit PNDG generates a DC voltage RDV whose polarity depends upon the logical value of the signal FWD.

If the outputs of the NAND gates $ND_1$, $ND_2$ are denoted by C and D, respectively, and if the preset rotational direction is the forward direction, then C, D and the signal FWD will be related in the manner shown in FIG. 13(b) when the spindle is rotating in the forward direction and when it is rotating in the reverse direction.

When the rotational direction signal FWD is logical "0" (the spindle is rotating in the reverse direction), a PNP transistor TR is rendered conductive so that the analog circuit PNDG generates a +7.5 volt DC voltage RDV. When FWD is a "1" (the spindle is rotating in the forward direction), the transistor TR is cut off so that the analog circuit PNDG generates a −7.5 volt DC voltage RDV.

A circuit 101 is included to generate the initially set voltage ISV and the bias voltage BIS, to integrate the actual speed AV of the spindle (the AV signal voltage) and to subtract the output voltage resulting from the integration operation (the actual rotational position of the spindle) from the initially set voltage ISV. Specifically, the DC voltage RDV obtained from the DC voltage generating circuit 100 is the −7.5 volt signal if the spindle is at rest or if it is rotating in the forward direction, or RDV is the +7.5 volt signal if the spindle is rotating in the reverse direction. The DC voltage RDV charges a capacitor C through an amplifier $AMP_1$ and a switch $S_9$, the voltage of the charge stored in the capacitor C becoming the value −$V_i$ or +$V_i$ which is the initially set voltage ISV. If the voltage of the actual speed signal AV is applied to the circuit 101 through either switch $S_8$ or $S_7$ after the switch $S_9$ has been opened, the capacitor C charges or discharges at the time constant RC in in dependence upon the direction of spindle rotation. As the capacitor C charges or discharges the coarse position deviation signal CPD appears at the output of amplifier $AMP_2$. The coarse position deviation signal CPD is generated due to the subtraction of the integration voltage, resulting from the integration of the actual speed AV, from the initially set voltage ISV, appears at the output of the amplifier $AMP_2$. The amplifier $AMP_2$, resistor R and capacitor C comprise an integration circuit. If the switches $S_9$, $S_{10}$ are closed after the voltage of the coarse position deviation signal CPD reaches a specified value, the circuit 101 acts as an amplifier, and the bias signal BIS at the specified level is generated and appears at the output of the amplifier $AMP_2$. In other words, in dependence upon the particular combination and timing of the opening and closing operation of the switches $S_7$ through $S_{10}$, first the initially set voltage ISV is generated, then the coarse position deviation signal CPD is generated, and finally the bias signal BIS is generated.

Blocks 102, 103 of FIG. 11(a) and 11(b) denote changeover circuits for switching gain in dependence upon gear ratio. These changeover circuits are operable to set the gain of the position control loop high when the gears between the DC motor 4 and the spindle 7 are set low (reduction ratio high), and to set the gain low when the gears are set high (reduction ratio low), that is, to set the gain low in comparison with the gain for the high reduction ratio. More specifically, when the reduction ratio is high, switches $S_7$, $S_2$ are closed to raise the gain, and when the reduction ratio is low, switches $S_8$, $S_3$ are closed to lower the gain. This eliminates spindle hunting and overshoot when stopping the spindle at the predetermined rotational position, and permits the spindle stopping operation to be completed in less time regardless of the scale of the reduction ratio.

Block at 104 of FIG. 11($b$) is a well-known absolute value circuit which generates the absolute value of the output from the circuit 101. A comparator 105 detects whether or not the coarse position deviation signal CPD has fallen below a predetermined level, and generates a signal NRPS which indicates that the predetermined portion (the magnetic body 10$a$) has drawn near the point in the environs of the predetermined rotational stopping position. The signal NRPS closes the switches $S_9$, $S_{10}$.

A gain adjustment circuit 106 adjusts the gain in dependence upon the gap between the magnetic body 10$a$ and the sensing portion 10$b$, and generates the detection voltage $DV_2$ (the fine position deviation voltage) having a prescribed slope. A slicer circuit 107 slices the approach signal ASV at a predetermined level and generates signal LS which indicates that the magnetic body has reached the point in the environs of the predetermined rotational position. The signal LS opens the switches $S_5$, $S_6$ and closes switch $S_4$. As a result, the fine position deviation signal $DV_2$ is generated as the deviation signal.

A forward-reverse changeover circuit 108 has a switch $S_5$ closed when the spindle is controlled by rotating it in the forward direction, and a switch $S_6$ closed when the spindle is controlled by rotating it in the reverse direction. An "in-position" signal generating circuit 109, comprising a comparator, monitors the fine position deviation signal $DV_2$ and generates the in-position signal INPOS when the spindle is within range of the predetermined rotational position. Thereafter a signal indicating completion of the orientation operation is transmitted to the numerical control unit.

Comparators 110 and 111 of FIG. 11($b$) monitor the fine position deviation signal $DV_2$ and generate signals NEG and POS respectively upon detecting whether the spindle is approaching the predetermined rotational direction while rotating in the reverse direction (signal NEG at logical "1") or while rotating in the forward direction (signal POS at logical "1"), respectively. One of the switches $S_5$ or $S_6$ will be closed and the other switch will be opened by the signals VZR and LS depending upon which of the signals NEG or POS is a "1". A waveform synthesizing circuit 112 generates either the fine position deviation signal or the coarse position deviation signal in dependence upon the open or closed state of the switch $S_4$, $S_5$ or $S_6$. A speed detection circuit 113 receives the voltage AV indicative of the actual speed of the spindle and generates the zero speed signal VZR when AV falls to zero. An orientation completion signal generating circuit 114 receives the in-position signal INPOS, the zero speed signal VZR and the orientation command signal ORCM, and takes the logical product of these signals, thereby generating the orientation completion signal ORDEN when INPOS, VZR and ORCM are all at logical "1".

In summary, if the orientation command signal ORCM goes to logical "1", at time $t_0$, the command speed voltage CV drops to zero volts, so that the actual speed decreases, and the voltage indicative of the actual speed AV dropping to zero volts and the zero speed signal VZR going to logical "1". When this occurs the loop changeover switch 12 is switched over to the side b, one of the switches $S_2$, $S_3$ is closed in accordance with the low/high setting of the gears, and one of the switches $S_5$, $S_6$ is closed in accordance with the direction either forward or reverse, of spindle rotation. This forms a position control loop, with the initially set voltage ISV being output by the changeover switch 12. It should be noted that the switch $S_9$ is closed, and that switches $S_7$, $S_8$, $S_{10}$ are open. The DC motor 4 shown in FIG. 5 begins rotating again so that the spindle is rotated and reaches the predetermined rotational position the first time (i.e., the signal LS is a "1", and the in-position signal INPOS is a "1"). Hence, at time $t_2$, switch $S_9$ is opened and one of the switches $S_7$, $S_8$ is closed in dependence upon the low/high setting of the gears. Therefore the coarse position deviation signal CPD is output by the changeover switch 12. Thereafter, as the actual speed and the position deviation decrease and the spindle approaches a point in the environs of the predetermined rotational position (time $t_3$), the comparator 105 generates the signal NRPS (logical "1"), causing the switches $S_9$ and $S_{10}$ to be closed. As a result, the bias signal BIS at the prescribed level is outputted by the changeover switch 12. As the spindle continues to rotate at a slower speed and reaches the area NCP in the environs of the predetermined rotational position (time $t_4$), the signal LS goes to the "1" level, switches $S_5$, $S_6$ are opened, and switch $S_4$ is closed. Hence, the fine position deviation signal $DV_2$ is outputted by the changeover switch 12. When the magnetic body 10$a$ (the predetermined point on the spindle) comes within range of the predetermined rotational position, the in-position signal INPOS is generated. This is followed by the actual speed of the spindle falling to zero, whereupon the zero speed signal VZR returns to logical "1". This completes the control operation for stopping the spindle at the predetermined rotational position, the orientation completion signal ORDEN being generated by the orientation completion signal generating circuit 114.

In the foregoing it was described that the operation for stopping the spindle at the predetermined position is carried out after the actual speed has dropped to zero. However, the spindle positioning can be performed when the actual speed has reached a certain speed other than zero.

In accordance with the present invention as described above, a spindle can be stopped at a predetermined rotational position with a high accuracy without relying upon contacting parts such as a mechanical brake. A highly accurate proximity switch is provided and adapted to produce a fine position deviation signal when a specified point on the spindle has reached the vicinity of the predetermined rotational position, whereby an extremely high accuracy on the order of from $\pm 0.03°$ to $\pm 0.05°$ can be obtained, as confirmed by actual measurements.

Furthermore, since the spindle can be stopped at the predetermined rotational position from both the forward and reverse directions, the control operation requires less time so that machining efficiency is improved. In addition, highly precise machining can be achieved and flawing of the workpiece is eliminated during a boring operation since the spindle can be stopped at the predetermined position without requiring a reversal in direction.

Although the invention has been described in its preferred form with a certain degree of particularity, it is obvious that many modifications and variations are possible in light of the above teachings. It is therefore to be understood that within the scope of the appended claims, the invention may be practiced otherwise than as specifically described.

What we claim is:

1. A control system for stopping a spindle at a predetermined rotational position, for driving a spindle in such a manner that a positional deviation between a present rotational position of a specified point on the spindle and the predetermined rotational position at which the specified point is to be stopped, is reduced to zero, thereby stopping the specified point on the spindle at the predetermined rotational position, said control system comprising:

detection means for detecting the direction of spindle rotation;

DC voltage generating means, operatively connected to said detection means, for generating a DC voltage having a first level or a second level in dependence upon the direction of spindle rotation as detected by said detection means; and means, operatively connected to the spindle, for generating a rotational position deviation signal including:

means, operatively connected to said DC voltage generating means, for generating a coarse rotational position deviation signal in dependence upon the first level or the second level DC voltage from said DC voltage generating means, the coarse rotational position deviation signal having such a polarity that the spindle is capable of being stopped at the predetermined rotational position regardless of whether the spindle is rotating in the forward or reverse direction; and a sensor, coupled to the spindle, for sensing the position of the spindle, for generating an output signal of zero when the specified point on the spindle arrives at the predetermined rotational position, for generating a first or second output signal when the specified point on the spindle is within a predetermined range of the predetermined rotational position to the left or right thereof, and for generating a fine rotational position deviation signal which crosses a zero volt level, whereby the coarse rotational position deviation signal from said means for generating the same is output as the rotational position deviation signal until the specified point on the spindle is within the predetermined range of the predetermined rotational position, and the fine rotational position deviation signal from said sensor is output as the rotational position deviation signal after the specified point on the spindle is within the predetermined range of the predetermined rotational position.

2. A control system, operatively connectable to receive an actual speed signal, for stopping a spindle at a predetermined rotational position, comprising:

means for generating a fine rotational deviation signal and a control signal when the specified point on the spindle is within a predetermined range of the predetermined rotational position;

means, operatively connectable to receive the actual speed signal, for detecting the direction of rotation of the spindle and for generating a rotational direction signal in dependence upon the direction of the rotation of the spindle;

means, operatively connected to said means for detecting the direction of rotation of the spindle and operatively connectable to receive the actual speed signal, for generating a coarse position deviation signal in dependence upon the rotational direction signal and the actual speed signal; and means, operatively connected to said means for generating the fine rotational deviation signal and to said means for generating the coarse position deviation signal, for outputting either the course position deviation signal or the fine position deviation signal in dependence upon the control signal, so that the spindle is rotated in such a manner that a positional deviation between a present rotational position of a specified point on the spindle and the predetermined rotational position at which the specified point on the spindle is to be stopped, is reduced to zero, so that the specified point on the spindle is stopped at the predetermined rotational position.

3. A control system according to claim 2, wherein said means for detecting the direction of rotation of the spindle and for generating the rotational direction signal comprises:

an amplifier, operatively connectable to receive the actual speed signal, for amplifying the actual speed signal and for generating an amplified actual speed signal;

a first comparator, having a first input operatively connected to said amplifier and having a second input operatively connected to a first reference voltage, for comparing the amplified actual speed signal with the first reference voltage and for generating a first logical signal when the amplified actual speed signal is greater than the first reference voltage and for generating a second logical signal when the amplified actual speed signal is less than or equal to the first reference voltage;

a second comparator, having a first input operatively connected to said amplifier and having a second input operatively connected to a second reference voltage, for comparing the amplified actual speed signal with the second reference voltage, for generating a third logical signal when the amplified actual speed signal is greater than the second reference voltage and for generating a fourth logical signal when the amplified actual speed signal is less than or equal to the second reference voltage;

means for presetting the direction from which the spindle will be stopped at the predetermined position;

a first NAND gate having a first input, operatively connected to said first comparator, for receiving the first and second logical signals, having a second input operatively connected to said means for presetting the direction and having an output;

a second NAND gate having a first input, operatively connected to said second comparator, for receiving the third and fourth logical signals, having a second input operatively connected to said means for presetting the direction and having an output;

a latch circuit having a first input operatively connected to the output of said first NAND gate, having a second input operatively connected to the output of said second NAND gate and having an output; and an analog circuit, having an input operatively connected to the output of said latch circuit and having an output, for generating the rotational direction signal.

4. A control system for stopping a spindle at a predetermined rotational position, for driving a spindle in such a manner that a positional deviation between a present rotational position of a specified point on the spindle and the predetermined rotational position at which the specified point is to be stopped, is reduced to zero, thereby stopping the specified point on the spindle at the predetermined rotational position, said control system comprising:

detection means for detecting the direction of spindle rotation;

DC voltage generating means, operatively connected to said detection means, for generating a DC voltage having a first level or a second level in dependence upon the direction of spindle rotation as detected by said detection means;

means, operatively connected to said DC voltage generating means, for generating a rotational position deviation signal in dependence upon the first level or the second level DC voltage output by said DC voltage generating means, the rotational position deviation signal having such a polarity that the spindle is capable of being stopped at the predetermined rotational position regardless of whether the spindle is rotating in the forward or reverse direction; and means, operatively connected to said means for generating the rotational position deviation signal, for receiving the rotational position deviation signal and for rotating and stopping the spindle, wherein when the spindle, which is rotating in either the forward or reverse direction, reaches a speed corresponding to an initial value of the rotational position deviation signal during the deceleration of the spindle, the spindle continues to be rotated in the same direction at the time said speed is reached by the rotational position deviation signal, thereby stopping the specified point on the spindle at the predetermined rotational position.

* * * * *

UNITED STATES PATENT AND TRADEMARK OFFICE
CERTIFICATE OF CORRECTION

PATENT NO. : 4,403,181 Page 1 of 4

DATED : September 6, 1983

INVENTOR(S) : Yoshinori Kohzai et al

It is certified that error appears in the above-identified patent and that said Letters Patent is hereby corrected as shown below:

Front page, [56], the name "Muary" should be "Maury--.

Abstract, line 4, "includes device" should be --includes a device--.

Column 1, line 2, "Spindle at" should be --A spindle at a--;

line 9, "Kahzai" should be --Kohzai--;

line 23, "a" should be --the--;

line 28, "also" should be --and also--;

line 29, delete "," after changed.

Column 2, line 28, insert "further" after "be", second occurrence;

line 48, "thus," should be --, thus,--;

line 52, "of" should be --with--;

UNITED STATES PATENT AND TRADEMARK OFFICE
CERTIFICATE OF CORRECTION

PATENT NO. : 4,403,181                           Page 2 of 4
DATED : September 6, 1983
INVENTOR(S) : Yoshinori Kohzai et al It is certified that error appears in the above-identified patent and that said Letters Patent is hereby corrected as shown below:

line 61, delete "with";

line 66, "with" should be --of--.

Column 3,      line 3, "which position is" should be --which is--;

line 31, "combersome" should be --cumbersome--;

line 45, "article" should be --article,--.

Column 4,      line 26, "spindle" should be --and spindle--;

line 61, "generated" should be --generates--.

Column 5,      line 13, "4 and serves" should be --4 serves--;

line 39, "generates" should be --generated--;

UNITED STATES PATENT AND TRADEMARK OFFICE
CERTIFICATE OF CORRECTION

Page 3 of 4

PATENT NO. : 4,403,181
DATED : September 6, 1983
INVENTOR(S) : Yoshinori Kohzai et al It is certified that error appears in the above-identified patent and that said Letters Patent is hereby corrected as shown below:

line 48, "both of" should be --both--;

line 61, "so mounted" should be --mounted--.

Column 6, line 17, "are in dependant" should be --are dependent--;

line 20, "circuit" should be --circuit,--;

line 44, "force, as" should be --force B-H curve, as--;

line 64, "abpout" should be --about--.

Column 8, line 34, "is generated" should be --is a--;

line 56, "Therefore" should be --Therefore,--;

line 64, "10(b) in" should be --10(b), in--.

Column 9, line 9, "generated in" should be --generated. In--;

line 31, "for" should be --for a--;

UNITED STATES PATENT AND TRADEMARK OFFICE
CERTIFICATE OF CORRECTION

PATENT NO. : 4,403,181

DATED : September 6, 1983

INVENTOR(S) : Yoshinori Kohzai et al

It is certified that error appears in the above-identified patent and that said Letters Patent is hereby corrected as shown below:

line 41, "11A" should be --11(a)--;

line 56, "13A" should be --13(a)--.

Column 10, line 45, "in in dependance" should be --in dependence--;

lines 52-53, delete ", appears at the output of the amplifier $AMP_2$".

Column 11, line 48, "respectively" should be --, respectively,--.

Column 14, line 54, "predetermined" should be --predetermined rotational--.

Signed and Sealed this

Twenty-fifth Day of September 1984

[SEAL]

Attest:

Attesting Officer

GERALD J. MOSSINGHOFF

Commissioner of Patents and Trademarks